Feb. 25, 1964  A. D. SANDS  3,122,162
FLOW CONTROL DEVICE
Filed June 20, 1963
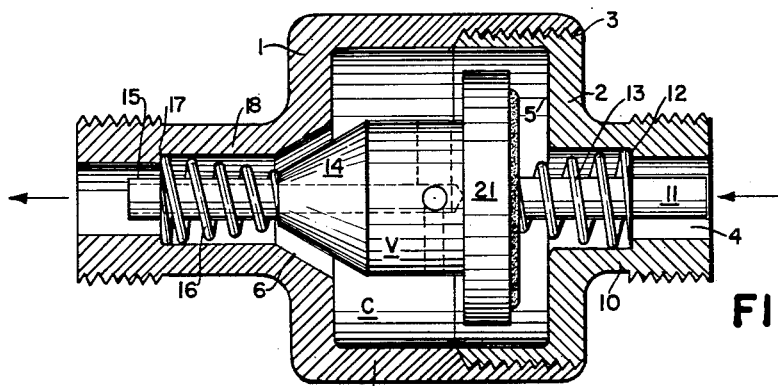
FIG.1.
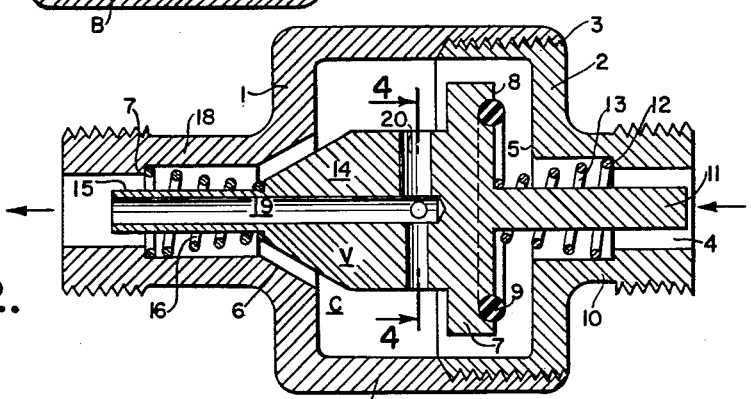
FIG.2.
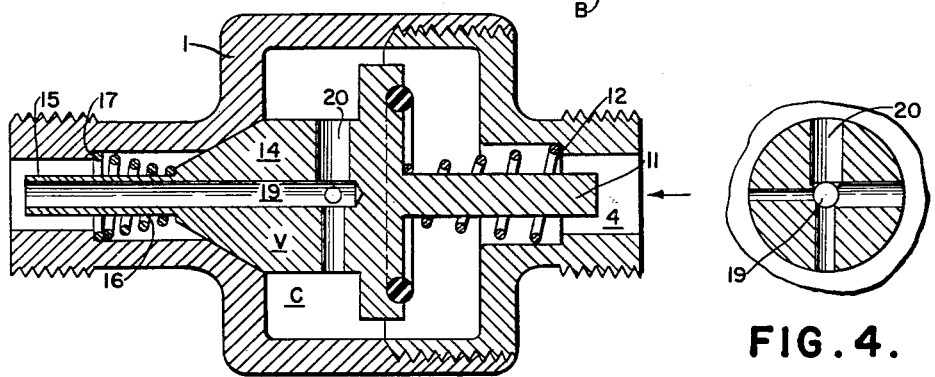
FIG.3.
FIG.4.
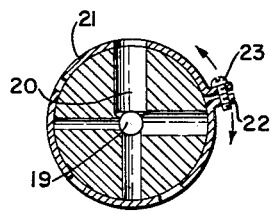
FIG.5.
INVENTOR
Asa D. Sands
BY Conden C. Henry
ATTORNEY

United States Patent Office 3,122,162
Patented Feb. 25, 1964

3,122,162
FLOW CONTROL DEVICE
Asa D. Sands, 3606 Federal St., Camden 5, N.J.
Filed June 20, 1963, Ser. No. 289,298
2 Claims. (Cl. 137—498)

This invention relates to a flow control device for use in connection with a metal conduit or a flexible hose employed to convey fluids in the form of liquids, gas, air or the like from a source of supply to the place of use or storage as the case may be, and is an improvement over the inventions covered by my Patents Nos. 2,623,725, granted December 30, 1952, and 3,085,589, granted April 16, 1963, both of which disclose valves designed primarily as safety devices. The present invention is not so limited in its application since it may be employed not only as a safety device but also as a regulator, or injector, or equalizer, or as a shut-off valve, and it is peculiarly adapted for use in connection with oil and gas lines. The manner in which my flow control device is so adapted for these several purposes will be explained as the description proceeds. Its use as a safety will be explained first.

Safety valves are known in the art and are extensively used to prevent injury to personnel. For example, the valves disclosed in my patents identified above are ordinarily used in a flexible compressed air line connected to a pneumatic tool. When such a line breaks, the sudden blast of air coming out of the broken end of the line at high pressure causes the flexible line to whip back and forth, and this whipping action constitutes a dangerous hazard to the user of the tool as well as to bystanders, especially if they are on a scaffold or in close quarters, such as a ditch.

One of the objections to such valves is their undue sensitivity whereby they respond to insignificant fluctations in pressure causing them to close when closure is not desired. As pointed out in my said Patent No. 3,085,589, when safety valves are used in connection with road machinery, it may be desirable to prevent the valves from closing on momentary fluctuations of pressure on the valves and still permit the valves to act if there is a major emergency which causes a violent pressure difference such as the bursting of a hose or pipe. In my said patent, I overcome this difficulty by employing a dash pot which prevents complete closing of the valve when minor differences in pressure occur, and such valve has been found satisfactory. However, I have improved on the valve revealed in that patent by permitting slow escape of fluid from one side of the valve element upon such minor fluctuations, as will hereinafter be more fully explained.

Another objectional feature of valves of the kind contemplated herein is that no provision was made for permitting adjustments whereby the amount of fluid which can flow therethrough to compensate for varying pressures at the inlet and outlet ends of the device when the same is in open condition. I have provided for such adjustments.

As previously stated, the versatility of my flow control device may be readily seen by reason of the fact that it is adaptable for uses other than as a safety valve. For example, it may be used as an ejector valve for permitting ejection of liquids or gas from one vessel to another in predetermined quantities when a predetermined pressure is reached. Also, it may be used to equalize the quantities of fluids in two separate connected containers, or to equalize the pressures therein. And, further, it can be used as a shut-off valve in any environment in which such a valve is desired, as when an explosion occurs in the line to which it is applied. Accordingly;

One object of my invention is to provide a valve which will function as an ejector valve for transferring liquids, gas, air and similar fluids from one container to another under controlled conditions.

Another object is to provide a valve which will function as an equalizing valve for regulating the flow of fluids between connected containers.

Another object is to provide a valve which will automatically function as a shut-off valve under abnormal pressure conditions.

Another object is to provide a valve which will automatically function to prevent whipping of broken flexible lines containing fluids of any kind.

A further object is to provide a valve which will automatically regulate the flow of fluids therethrough in accordance with the differences in pressures on the intake and outlet ends thereof.

An additional object is to provide a flow control device which can be manually adjusted to regulate the flow of fluids through the same.

Still another object is to provide a valve which will not operate on minor surges in the fluids passing therethrough.

These and other objects of my invention will become apparent from the following description and the attached drawings in the latter of which like reference characters refer to the same parts in all of the views and in which;

FIG. 1 is a side elevation of my valve member showing the same inside a valve housing, the latter of which is shown in section;

FIG. 2 is a longitudinal sectional view of FIG. 1, showing the valve member in open position;

FIG. 3 is a view similar to FIG. 2, showing the valve member seated against the exit end of the housing;

FIG. 4 is a cross-sectional view of the valve member, taken along the line 4—4 of FIG. 2, and FIG. 5 is a view similar to FIG. 4, showing the apertured band for adjusting the amount of fluid which can flow through the valve element.

Describing my invention by way of illustration but not by way of limitation, it will be seen that the same includes a circular valve housing indicated generally by the letter B, which housing consists of body members 1 and 2 threaded together as indicated at 3. Such body members include hollow lateral extensions which are provided on the interior portions thereof with annular shoulder 12 constituting seats for valve springs. The valve body B has an elongated passage 4 extending from one end thereof to the other, which passage includes an enlarged centrally disposed valve chamber indicated by the letter C. The opposite ends of such chamber are formed in such way as to provide annular valve seats, the valve seat 5 on the inlet end of the body being flat and the valve seat 6 on the exit end of the body being funnel shaped.

Located within the valve chamber is a valve member designated by the letter V. Such member has an outwardly projecting annular shoulder, the end surface 8 of which is parallel with the valve seat 5. A circular recess is formed in the outer surface of the shoulder on the valve member in which is placed an elastomer O-ring 9 which extends around the hub portion of the valve member and projects sufficiently beyond the diameter of the valve seat 5 so that when the valve member reaches limiting position on the intake side of the device, the O-ring will make a tight seal against said seat.

Formed integral with the valve member and projecting laterally therefrom into the hollow extension 10 of the body member is a valve stem 11, and surrounding said stem and seated on the annular shoulder 12 formed in the extension of such body member is a coiled spring 13, the opposite end of which bears against the end surface 8 of the shoulder 7 on the valve member V.

The opposite end of the valve member is tapered in the shape of a cone. This cone is adapted to seat in the funnel shaped valve seat 6. Projecting laterally from the cone is a valve stem 15. A coiled spring 16 surrounds such stem and is interposed between the apex of the cone and an annular shoulder 17 formed in the hollow extension 18 of the valve body.

The length of the valve member V is such that the closure means provided by the cone 14 will not seat on the funnel seat 6 at the exit of the device when such valve member is seated on seat 5. Therefore, such member will remain open with respect to one of the seats 5 and 6 when it is closed on the other.

A longitudinal passage 19 is formed in valve stem 15, which passage leads into radially extending holes 20 constituting by-passes of different diameters drilled into the body of such member. Surrounding such holes is a band 21 having out-turned ears 22, and this band is provided with the same number and size holes as are formed in the valve body member whereby the band may be shifted to close all or a part of such holes and held in place by a small screw bolt 23 extending through the ears 22. Screw-plugs may be substituted for the band. By this arrangement, the valve member will not entirely close the passage 4 when the cone 14 is seated unless the band 21, or plugs, closes all of the holes 20. Also, by this arrangement the volume of fluid which can pass through the passage 19 can be regulated.

The springs 13 and 16 are chosen to keep the valve element V in open position as illustrated by FIG. 2 during normal flow under particular pressures and volumes of flow, but insufficient to prevent closure of such element under abnormal conditions, and the springs have different but predetermined strengths so that they can be adjusted for varying conditions of use. For example, spring 13 may be made stronger than spring 16 to cause the valve member V to remain closed under normal conditions when it is desired to use the end 18 of the valve as the inlet.

In operation, when my flow control device is used to prevent whipping of a compressed air hose, for example, the device is installed in the hose and the smallest hole 20 in the valve member V is uncovered by shifting the band 21 to cover the remaining holes. So long as the pressures on both sides of the shoulder 7 remains substantially equal, the valve member V remains in its normal open position, but should the air hose break beyond the exit end of the device and thereby release back pressure, the sudden blast of air on the inlet side of the valve member would instantly seat the valve cone 14 on its seat 6 and thus prevent whipping of the air hose. When the by-pass opening in the valve element is used, as soon as the hose is repaired, fluid flowing through the by-pass will build up the pressure in the remote portion of the hose under the closed valve element and thus when the pressure becomes high enough to balance the pressure on the opposite side of the valve element, the spring 17 will be enabled to open the valve and the system will automatically be restored to service.

Viewed as a shut-off valve, it is obvious that if, for example, the device is installed in a gas line connecting two or more gas holders, any explosion which occurs on either side of the valve element would instantly close the same.

Used as an ejector valve or as an equalizing valve, it will be apparent that the rate of flow of liquids through the device can be regulated by simply opening or closing one or more of the by-passes 20 in the valve element.

An important feature of my invention relates to its capacity to regulate the flow of fluids therethrough where such fluids are under constantly varying pressures. When the device is connected between two pressure sources which may vary and one or more of the by-passes 20 opened, the valve will remain in the open position so long as there is no variation in pressures, the fluid passing through the inlet of the device, around the annular shoulder 7 and from thence over the cone 14 and through the by-pass 20 and passage 19 into the exit of the device. As pressure on the inlet side of the device varies, the space between the cone 14 and its seat 6 will correspondingly vary and thereby restrict the amount of fluid which can pass around such cone. If the pressure is great enough to completely seat the cone on its seat, then the fluid can only pass through the by-pass 20 and passage 19 and, as previously stated, the volume of fluid which can be so passed can be regulated by closing one or more of the holes 20 constituting by-passes in the valve member.

Having thus described my invention, what I claim as new and desire to secure by Letters Patent is set forth in the following claims.

1. In a flow control device, a valve body having a valve chamber therein; valve seats formed in said body at opposite ends of said chamber, one of said seats being flat and the other of said seats being funnel shaped; a valve element having laterally and oppositely extending valve stems thereon movably disposed in said chamber, one of said stems having a longitudinally extending passageway therethrough, the said valve element also having an annular shoulder on one end thereof adapted to seat on said flat valve seat and the other end of said element being cone shaped to seat in the funnel shaped seat of said body, and the said valve element being provided with radially disposed holes of different diameters to provide for regulation of fluid passing through the said valve element, the said holes communicating with one end of the passageway formed in one of said valve stems; a closure means associated with said valve element for selectively closing the holes therein, and a coiled spring surrounding each of said valve stems and bearing against said valve element for maintaining the same during normal operation of the device in a position to provide for free flow of fluid therethrough.

2. The combination set forth in claim 1 wherein the said closure means comprises a band having the same number and size holes therein as the holes provided in said closure means.

References Cited in the file of this patent
UNITED STATES PATENTS

| | | |
|---|---|---|
| 2,245,271 | Guill | June 10, 1941 |
| 2,623,725 | Sands | Dec. 30, 1952 |
| 2,676,613 | Baxter | Apr. 27, 1954 |